United States Patent
Yi et al.

(10) Patent No.: US 8,259,697 B2
(45) Date of Patent: Sep. 4, 2012

(54) TRANSMISSION METHOD OF MOBILE STATION FOR RANDOM ACCESS CHANNEL DIVERSITY

(75) Inventors: Hyo-Seok Yi, Daejeon (KR); Il-Gyu Kim, Seoul (KR); Young-Jo Ko, Daejeon (KR); Kapseok Chang, Daejeon (KR); Hyeong-Geun Park, Daejeon (KR); Young-Hoon Kim, Daejeon (KR); Seung-Chan Bang, Daejeon (KR)

(73) Assignees: Electronics and Telecommunications Research Institute, Daejeon (KR); Samsung Electronics Co., Ltd, Suwon-Si (KR)

( * ) Notice: Subject to any disclaimer, the term of this patent is extended or adjusted under 35 U.S.C. 154(b) by 855 days.

(21) Appl. No.: 12/297,735

(22) PCT Filed: Apr. 19, 2007

(86) PCT No.: PCT/KR2007/001911
§ 371 (c)(1),
(2), (4) Date: Oct. 20, 2008

(87) PCT Pub. No.: WO2007/120020
PCT Pub. Date: Oct. 25, 2007

(65) Prior Publication Data
US 2009/0175220 A1   Jul. 9, 2009

(30) Foreign Application Priority Data

| Apr. 19, 2006 | (KR) | 10-2006-0035326 |
| Jul. 31, 2006 | (KR) | 10-2006-0072268 |
| Jan. 10, 2007 | (KR) | 10-2007-0003087 |
| Apr. 19, 2007 | (KR) | 10-2007-0038150 |

(51) Int. Cl.
*H04W 4/00* (2009.01)
*H04B 7/208* (2006.01)

(52) U.S. Cl. ........................ 370/344; 370/328
(58) Field of Classification Search .................. 370/203, 370/210, 310, 328, 329, 344, 343; 455/522
See application file for complete search history.

(56) References Cited

U.S. PATENT DOCUMENTS
6,751,465 B2 * 6/2004 Nakada .................. 455/512
(Continued)

FOREIGN PATENT DOCUMENTS
| KR | 10-2001-0080168 | 8/2001 |
| KR | 10-2005-0048659 | 5/2005 |
| WO | 00/21320 | 4/2000 |
| WO | 2004/038951 | 5/2004 |

OTHER PUBLICATIONS
International Search Report, Application No. PCT/KR2007/001911, Dated Jul. 11, 2007.
(Continued)

*Primary Examiner* — Chi Pham
*Assistant Examiner* — Robert Lopata
(74) *Attorney, Agent, or Firm* — Kile Park Goekjian Reed & McManus PLLC

(57) ABSTRACT

A transmission method performed by a mobile station for random access channel (RACH) burst transmission diversity gain is provided. According to the method, a variety of combinations of a time switching transmit diversity (TSTD) technique, a frequency hopping technique, and a power ramping technique that are robust against fading channel environments are applied to transmission of an RACH burst, thereby increasing the probability of detecting an RACH signature of a base station. Also, by using the transmission parameters (subband frequencies, transmission antennas, power, etc.) which are used for successful transmission of an RACH burst, for transmission of a successive user packet data, reliable transmission of the successive user packet data can be performed.

15 Claims, 13 Drawing Sheets

U.S. PATENT DOCUMENTS

| | | |
|---|---|---|
| 6,961,545 B2 | 11/2005 | Tehrani et al. |
| 7,302,276 B2 * | 11/2007 | Bernhardsson et al. ...... 455/522 |
| 7,738,889 B2 * | 6/2010 | Nakada .......................... 455/506 |
| 2002/0061005 A1 | 5/2002 | Lee et al. |
| 2006/0187876 A1 * | 8/2006 | Schmidl et al. ............... 370/328 |
| 2007/0064665 A1 * | 3/2007 | Zhang et al. .................. 370/343 |
| 2007/0066228 A1 * | 3/2007 | Leinonen et al. .......... 455/67.11 |
| 2008/0316913 A1 * | 12/2008 | Kim et al. ..................... 370/210 |
| 2009/0201865 A1 * | 8/2009 | Uemura et al. ............... 370/329 |

OTHER PUBLICATIONS

Michel T. Ivrlac, et al., "On Time-Switched Space-Time Transmitt Diversity in MISO Systems", Institute for Circuit Theory and Signal Processing Munich University of Technology, pp. 710-714.

PCT Written Opinion for PCT/KR2007/001911, Dated Jul. 20, 2007.

* cited by examiner

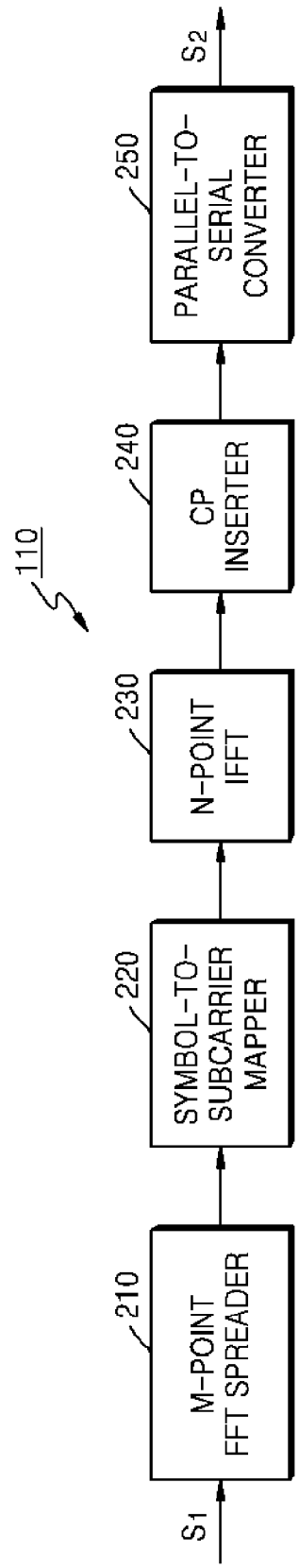

TRANSMISSION METHOD OF MOBILE STATION FOR RANDOM ACCESS CHANNEL DIVERSITY

TECHNICAL FIELD

The present invention relates to a transmission method of a mobile station, and more particularly, to a transmission method of obtaining random access transmission diversity gain when a mobile station transmits a random access channel (RACH) burst and a successive user packet data to a base station in a cellular system based on orthogonal frequency division multiple access (OFDMA).

BACKGROUND ART

Currently, in regard to wireless transmission technologies for long term evolution (LTE), a third generation partnership project (3GGP) uses an orthogonal frequency division multiple access (OFDMA) modulation method for a downlink transmission method, and considers a discrete Fourier transform-spread (DFT-S) OFDMA method as a candidate technology for an uplink transmission method.

Also, in order to introduce a multi input multi output (MIMO) technology into a forward link, a base station and a mobile station are considered to each essentially use two or more antennas.

In addition, a transmission technology using frequency hopping with a concept of a subband, by dividing predetermined resources when transmission is performed through a random access channel (RACH), is also considered.

Meanwhile, in a cellular system that is a fading channel environment, a base station should detect an RACH burst transmitted by a mobile station when the mobile station attempts random access, and the mobile station should transmit a successive user packet data with a higher reliability. Accordingly, a transmission method by a mobile station, by which in a fading channel environment, the probability of detection by a base station of an RACH burst can be increased, and reliable transmission of the successive user packet data can be performed, is necessary.

DETAILED DESCRIPTION OF THE INVENTION

Technical Problem

The present invention provides a transmission method of a mobile station having a multi transmission antenna capable of increasing the probability of detection by a base station of a random access channel (RACH) burst, and performing a successive user packet data transmission that is robust against a fading environment.

The objectives, characteristics, and merits will now be described more clearly with embodiments of the present invention with reference to the accompanying drawings, and accordingly, a person of ordinary skill in the art of the present invention will be able to use the technical idea of the present invention more easily.

Also, it can be easily understood that the objectives and merits can be implemented by using means and combinations of the means in the claims.

Technical Solution

According to an aspect of the present invention, there is provided a transmission method performed by a mobile station of obtaining random access diversity gain, the method including: (a) transmitting a random access channel (RACH) burst to a base station, by using a transmission antenna selected from among multiple transmission antennas; (b) if an acknowledgement (ACK) response to the RACH burst from the base station is received, transmitting a successive user packet data by using the transmission antenna which is used for transmission of the RACH burst; (c) if a non-acknowledgement (NACK) response to the RACH burst from the base station is received, transmitting a new RACH burst to the base station, by using a transmission antenna different from the previous transmission antenna; and if (d) a NACK is received while all the multiple transmission antennas are used, newly setting a transmission power higher than the previously set transmission power, and then, returning to step (a).

According to another aspect of the present invention, there is provided a transmission method performed by a mobile station of obtaining random access diversity gain, the method including: (a) transmitting an RACH burst to a base station, by using a transmission antenna selected from among multiple transmission antennas and a set subband; (b) if an ACK of the RACH burst from the base station is received, transmitting a successive user packet data by using the transmission antenna and the subband which are used for transmission of the RACH burst; (c) if a NACK of the RACH burst from the base station is received, transmitting a new RACH burst to the base station, by using a transmission antenna and a subband different from the previous transmission antenna and subband, respectively; and (d) if a NACK is received while all combinations of the transmission antennas and subbands are used, newly setting a transmission power higher than the previously set transmission power, and then, returning to step (a).

According to another aspect of the present invention, there is provided a transmission method performed by a mobile station of obtaining random access diversity gain, the method including: (a) transmitting an RACH burst to a base station, by using a set subband; (b) if an ACK of the RACH burst from the base station is received, transmitting a successive user packet data to the base station by using the subband for the transmission of the RACH burst; and (c) if a NACK of the RACH burst from the base station is received, transmitting a new RACH burst to the base station, by using a subband different from the previous subband.

The method may further include, (d) If a NACK from the base station is received while a predetermined time has elapsed, newly setting a transmission power higher than the previously set transmission power, and then, returning to step (a).

The transmission power of the successive user packet data may be set based on the transmission power which is used for the transmission of the RACH burst of which the ACK is generated.

According to another aspect of the present invention, there is provided a computer readable recording medium having embodied thereon a computer program for executing the method of obtaining random access diversity gain in a mobile station.

Advantageous Effects

According to the present invention, by applying a variety of combinations of the time switching transmit diversity (TSTD), frequency hopping, and power ramping techniques that are robust against a fading channel environment, to transmission of a random access channel (RACH) burst, the probability of detecting an RACH signature of the base station can be increased.

Also, according to the present invention, by using the transmission parameters (subband frequencies, transmission antennas, power, etc.) which are used for successful transmission of an RACH burst, for transmission of a successive user packet data, reliable transmission of the successive user packet data can be performed.

DESCRIPTION OF THE DRAWINGS

FIG. 2 is a block diagram illustrating an internal structure of an orthogonal frequency division multiple access (OFDMA) modulation unit of the transmission apparatus illustrated in FIG. 1 according to an embodiment of the present invention;

BEST MODE

Mode of the Invention

Figure 1:
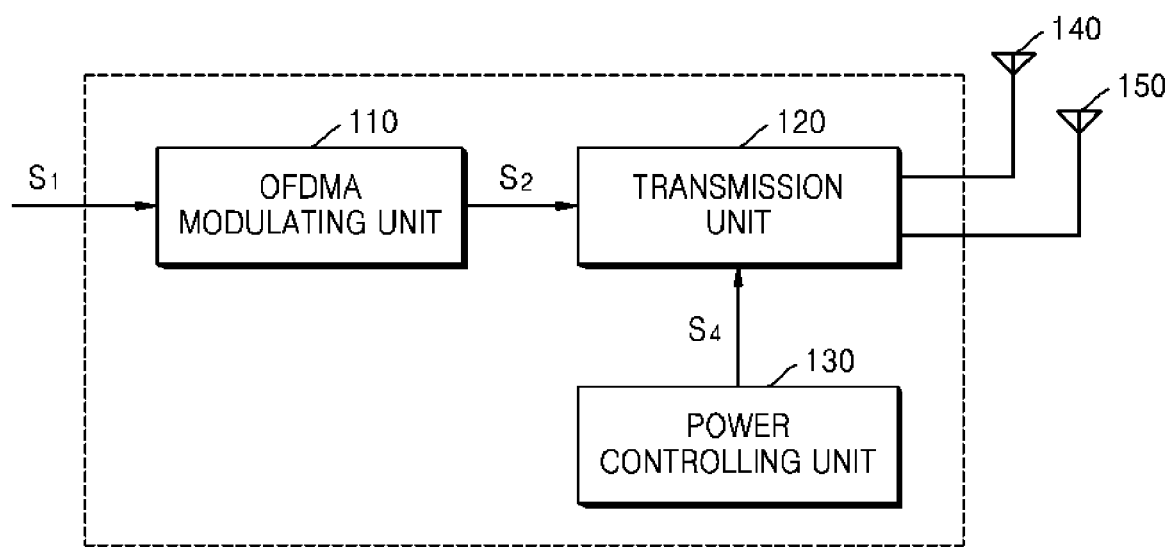
FIG. 1 is a block diagram illustrating an internal structure of a transmission apparatus of a mobile station obtaining transmission diversity gain of a random access channel (RACH) burst, by using a single subband (single band), power ramping, and a time switching transmit diversity (TSTD) method according to an embodiment of the present invention.

The present invention will now be described more fully with reference to the accompanying drawings, in which exemplary embodiments of the invention are shown. Like reference numerals in the drawings denote like elements, and thus their description will be omitted. Also, in the explanation of the present invention, if it is determined that a detailed explanation of a conventional technology related to the present invention may confuse the scope of the present invention, the description will be omitted.

Also, when a part is described to "include" an element, it does not mean that other elements are excluded, but it means that the part may further include other elements, unless otherwise described.

The present invention relates to a transmission method of a mobile station to obtain diversity gain when a random access channel (RACH) burst is transmitted.

The RACH burst includes a signature sequence of a frequency (or time) domain which a base station uses in order to identify a mobile station attempting random access, and may include information on at least one of user identification and a resource request for setting up a call. The RACH burst may be used as a response to a base station that is paging or may also be used when a mobile station attempts to call the base station.

After demodulating a received RACH burst signal, the base station transmits an acknowledgement signal (ACK) or a non-acknowledgement signal (NACK) as a response to the received signal, to the mobile station.

When the base station demodulates the RACH burst signal and transmits the response, a bit which is used to adjust transmission timing of a mobile station is transmitted through a downlink so that when traffic data of each mobile station is transmitted, the data can be received within a cyclic prefix (CP).

For convenience of explanation, in the present invention, an example of a mobile station which uses a discrete Fourier transform-spread (DFT-S) orthogonal frequency division multiple access (OFDMA) modulation method as an OFDMA modulation method will be described. However, it can be clearly understood by a person of ordinary skill in the art of the present invention that the present invention can be also applied to a mobile station using an ordinary OFDMA modulation method.

A variety of embodiments of a transmission method used by a mobile station for obtaining diversity gain when an RACH burst is transmitted, and a transmission apparatus using the method will now be explained.

FIG. 1 is a block diagram illustrating an internal structure of a transmission apparatus of a mobile station obtaining transmission diversity gain of a RACH burst, by using a single subband (single band), power ramping, and a time switching transmit diversity (TSTD) method according to an embodiment of the present invention.

Referring to FIG. 1, the transmission apparatus having two transmission antennas 140 and 150 includes an OFDMA modulating unit 110, a transmission unit 120, and a power controlling unit 130.

The OFDMA modulating unit 110 allocates a predetermined subband to an RACH burst ($S_1$), and OFDMA-modulates the burst, thereby generating an RACH burst signal ($S_2$) which is a modulated signal. The OFDMA modulating unit 110 modulates a successive user packet data including an RACH message, and transmits the modulated signal to the transmission unit 120, if the transmission apparatus receives an ACK response to the RACH burst from a base station. In this case, the successive user packet data is allocated the subband allocated to the RACH burst which has received the ACK.

The transmission unit 120 transmits the RACH burst signal ($S_2$), which is the output of the OFDMA modulating unit 110, to the base station at a predetermined transmission power, by alternately using the transmission antennas 140 and 150. If a NACK response is received from the base station while all transmission antennas 140 and 150 have been used, power is raised and then, an RACH burst signal is transmitted. If an ACK of the RACH burst from the base station is received, the transmission unit 120 amplifies and up-converts the OFDMA-modulated successive user packet data received from the OFDMA modulating unit 110, and then, transmits the data by using the transmission antenna which is used to transmit the RACH burst of which the ACK is received. In this case, the transmission power of the successive user packet data is calculated based on the power of the RACH burst of which the ACK is received. Accordingly, the transmission power of the data may be equal to or different from the power set to the RACH burst of which the ACK is received.

The power controlling unit 130 generates a control signal ($S_4$) for controlling the power of the RACH burst signal ($S_2$). If only a NACK is received while an RACH burst is transmitted by using all transmission antennas at a predetermined level of power, the power controlling unit 130 sets the transmission power for transmitting the RACH burst, to a higher level than the previous level. Also, if an ACK is received, the power controlling unit 130 sets a transmission power for the user packet, including an RACH message, which is calculated based on the power level used to transmit the RACH burst of which the ACK is received. Accordingly, the transmission power of the data may be equal to or different from the power set to the RACH burst of which the ACK is received.

FIG. 2 is a block diagram illustrating an internal structure of an OFDMA modulating unit 110 of the transmission apparatus illustrated in FIG. 1 according to an embodiment of the present invention.

Referring to FIG. 2, the OFDMA modulating unit 110 includes an M-point fast Fourier transform (FFT) spreader 210, a symbol-to-subcarrier mapper 220, an N-point inverse fast Fourier transform (IFFT) unit 230, a CP inserter 240, and a parallel-to-serial converter 250.

The M-point FFT spreader 210 performs FFT transformation of M input symbols formed with complex number values on a signal constellation diagram, i.e., the RACH burst ($S_1$).

The symbol-to-subcarrier mapper 220 maps the M symbols output from the M-point FFT spreader 210 onto subcarriers. The subcarrier mapping method that the symbol-to-subcarrier mapper 220 can use is not limited by a specific method.

The N-point IFFT unit 230 performs N-point IFFT transformation of the complex number values mapped onto N subcarriers. The CP inserter 240 inserts a CP into the output of the N-point IFFT unit 230. The parallel-to-serial converter 250 converts the output of the CP inserter 240 input in parallel into a serial signal.

Figure 3A:
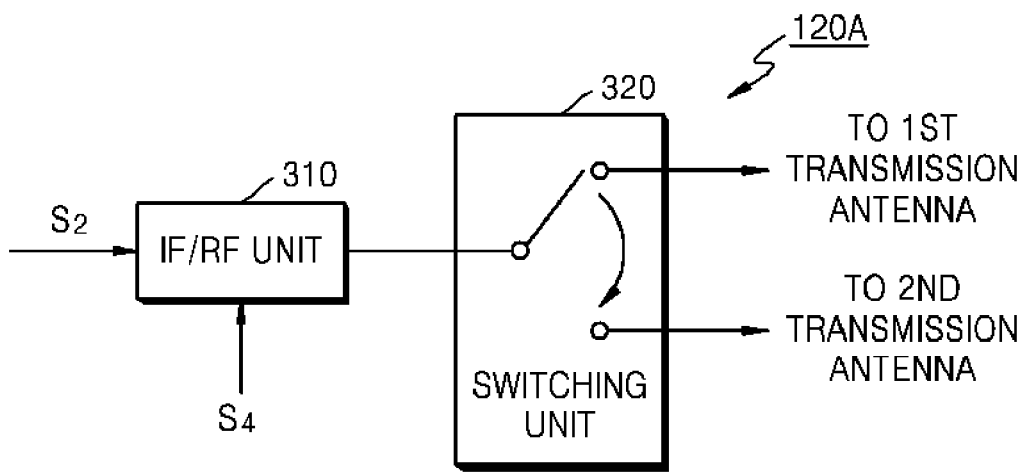
FIGS. 3A and 3B are block diagrams illustrating structures of a transmission unit of the transmission apparatus illustrated in FIG. 1 according to an embodiment of the present invention.
Figure 3B:
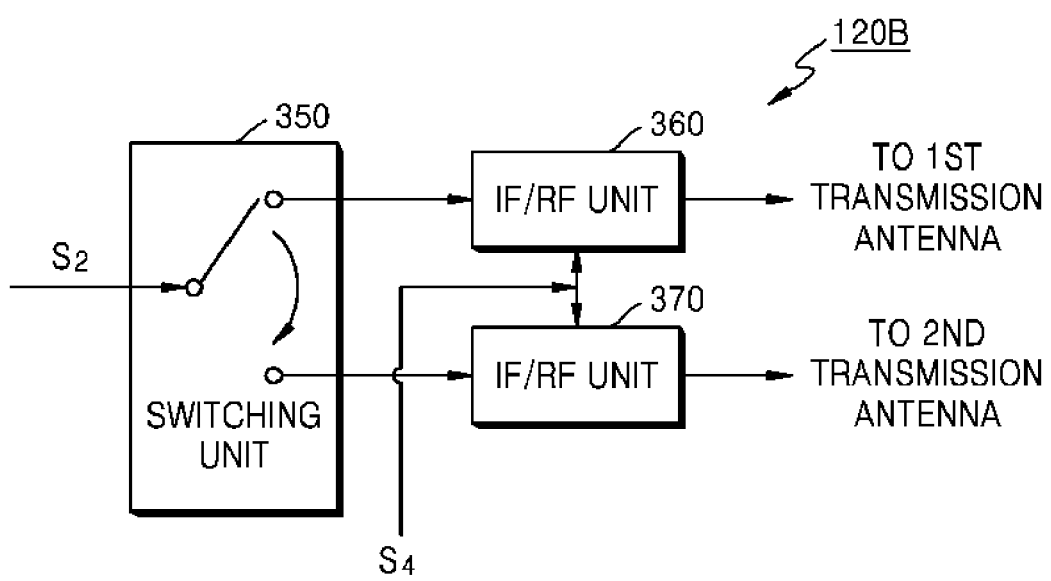

FIGS. 3A and 3B are block diagrams illustrating internal structures of the transmission unit 120 of the transmission apparatus illustrated in FIG. 1 according to an embodiment of the present invention.

Referring to FIG. 3A, a transmission unit 120A includes an Intermediate Frequency/Radio Frequency (IF/RF) unit 310 and a switching unit 320.

The IF/RF unit 310 includes an up-converter and an amplifier, and amplifies and up-converts the RACH burst signal ($S_2$), thereby generating a radio frequency (RF) signal having a transmission power set by the control signal ($S_4$) of the power controlling unit 130.

The switching unit 320 connects two transmission antennas 140 and 150 to the IF/RF unit 310 so that the RACH burst can be alternately transmitted through the transmission antennas 140 and 150. The switching unit 320 selects one of the transmission antennas 140 and 150 according to a TSTD technique and provides the output signal of the IF/RF unit 310 to the selected transmission antenna.

Referring to FIG. 3B, a transmission unit 120B includes a switching unit 350 and IF/RF units 360 and 370.

The switching unit 350 selects a transmission antenna to transmit the RACH burst signal ($S_2$) according to a TSTD technique and provides the RACH burst signal ($S_2$) to the IF/RF unit 360 or 370 connected to the selected transmission antenna 140 or 150.

The IF/RF unit 360 includes an up-converter and an amplifier, and amplifies and up-converts a signal input from the switching unit 350, thereby generating an RF signal having a transmission power set by the control signal ($S_4$) of the power controlling unit 130 and transmitting the RF signal to the first transmission antenna 140. The IF/RF unit 370 includes an up-converter and an amplifier, and amplifies and up-converts a signal input from the switching unit 350, thereby generating an RF signal having a transmission power set by the control signal ($S_4$) of the power controlling unit 130 and transmitting the RF signal to the second transmission antenna 150.

While the switching of the transmission unit 120A illustrated in FIG. 3A is performed in an RF band, the switching of the transmission unit 120B illustrated in FIG. 3B is performed in a base band. Accordingly, the transmission unit 120A illustrated in FIG. 3A requires one IF/FR unit and the transmission unit 120B illustrated in FIG. 3B requires the same number of IF/RF units as the number of transmission antennas.

Figure 4:
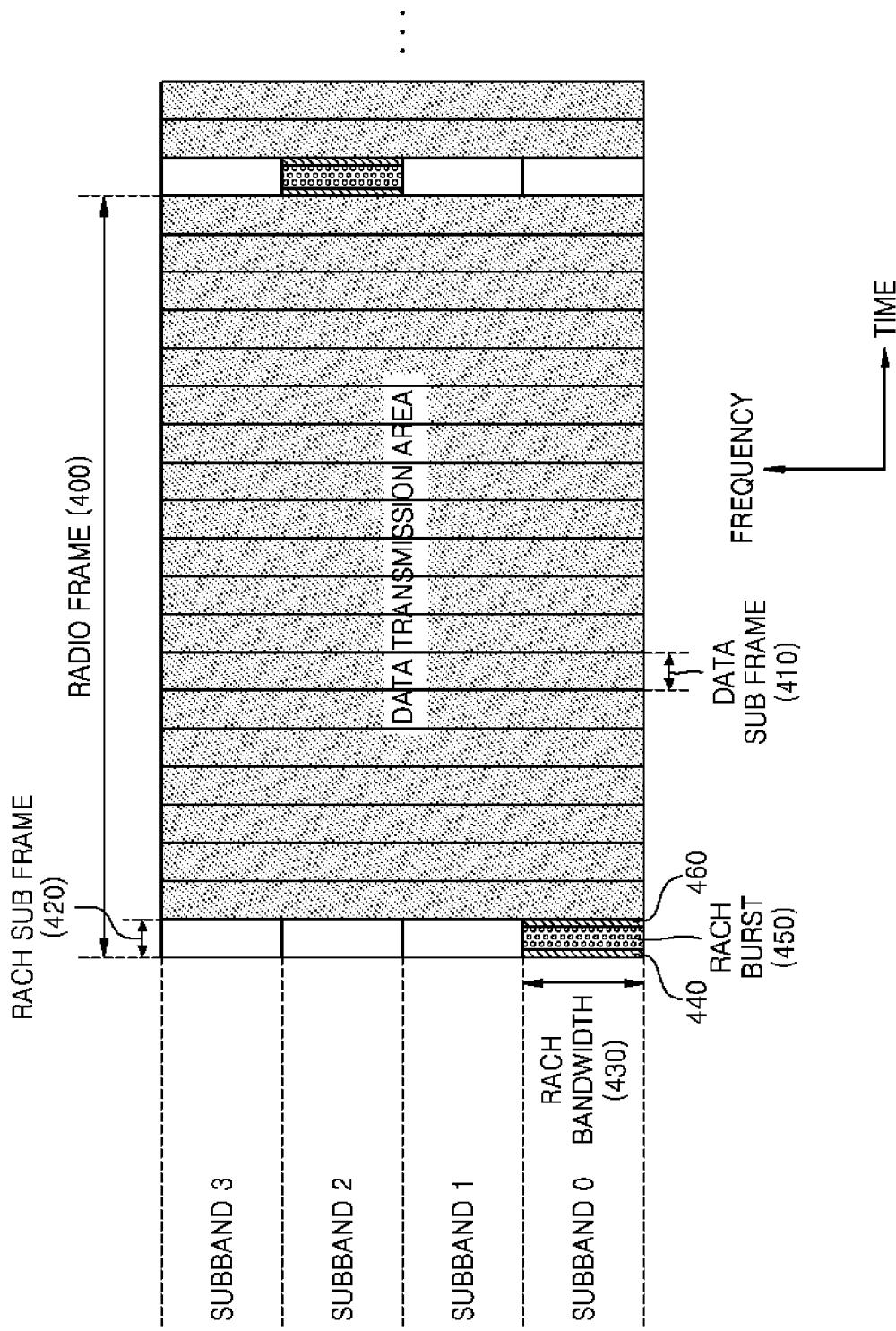
FIG. 4 is a diagram illustrating a structure of a third generation (3G) long term evolution (LTE) uplink frame using a discrete Fourier transform-spread (DFT-S) OFDMA method according to an embodiment of the present invention.

FIG. 4 is a diagram illustrating a structure of a third generation (3G) long term evolution (LTE) uplink frame using a DFT-S OFDMA method according to an embodiment of the present invention.

Referring to FIG. 4, one radio frame 400 is formed with an RACH transmission area for transmitting an RACH burst and a data transmission area for transmitting user packet data. The data transmission area is composed of a plurality of data sub frames 410 and the RACH transmission area is composed of one or more RACH sub frames 420. The RACH sub frame 420 is divided into a plurality of subbands, each of which has an RACH bandwidth 430. FIG. 4 illustrates four subbands expressed as subband 0, subband 1, subband 2, and subband 3. When an RACH burst signal is transmitted, a mobile station uses only one subband in one RACH sub frame.

An RACH burst signal includes guard times 440 and 460 and an RACH burst 450 in the time domain. Accordingly, in the present invention, an RACH burst and an RACH burst signal can be used interchangeably.

In general, in the 3G LTE, the length of one sub frame is 0.5 msec and the length of a radio frame is 10 msec. FIG. 4 illustrates an example in which only one RACH sub frame exists in a 10-msec radio frame.

The mobile station transmits an RACH burst signal through one selected transmission antenna in one subband in the RACH sub frame, by using an arbitrary RACH signature defined in a current cell, and receives an acquisition indication (AI) of the signal from a base station. If the AI is a NACK, the mobile station again transmits an RACH burst signal, by using an arbitrary RACH signature through another transmission antenna in another subband in a next RACH sub frame. This process is repeatedly performed until an ACK from the base station is received. In case of the embodiment illustrated in FIG. 1, an RACH burst can be transmitted in an identical subband.

Figure 5:
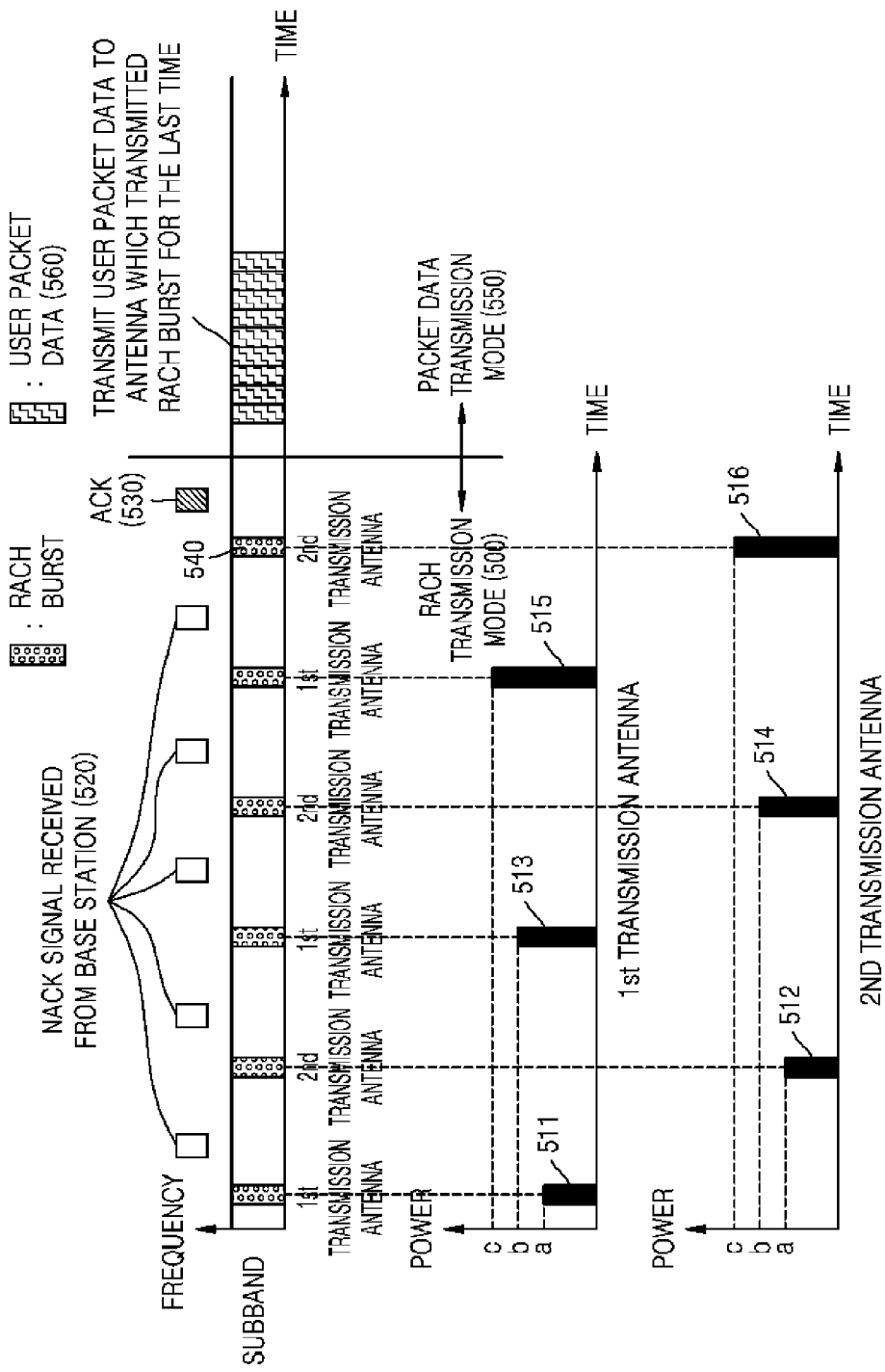
FIG. 5 is a diagram illustrating an example of a method of obtaining transmission diversity gain of an RACH burst by using the transmission apparatus illustrated in FIG. 1 according to an embodiment of the present invention.

FIG. 5 is a diagram illustrating an example of a method of obtaining transmission diversity gain of an RACH burst by using the transmission apparatus illustrated in FIG. 1 according to an embodiment of the present invention.

In the current embodiment, two first transmission antenna and second transmission antenna are used. Also, for the frame structure of the current embodiment, the 3G uplink frame structure using the DFT-S OFDMA method illustrated in FIG. 4 can be referred to.

Referring to FIG. 5, in an RACH transmission mode 500, a mobile station transmits an RACH burst to a base station, by switching transmission antennas at a predetermined power level. The RACH burst signal is loaded on a subband of a first radio frame, and transmitted through a first transmission antenna with a transmission power 511 at level (a). If a NACK 520 from the base station is received, the mobile station transmits an RACH burst signal in a subband of a second radio frame, through a second transmission antenna with a transmission power 512 at level (a). If an ACK from the base station is not received even after all transmission antennas have been used, the mobile station transmits an RACH burst, by switching the transmission antennas with a transmission power at levels (b) and (c) which are predetermined margins higher, respectively, than the previous transmission power level (a).

If the RACH burst signal is loaded on a subband of a sixth radio frame and transmitted through the second transmission antenna with a transmission power at level (c), and the mobile station receives an ACK signal 530 from the base station, the transmission mode of the mobile station changes from the RACH transmission mode 500 to a packet data transmission mode 550. In the packet data transmission mode 550, the mobile station transmits a successive user packet data 560 through the second transmission antenna which transmitted the RACH burst signal 540 of which the ACK signal is received.

Since the second transmission antenna, which transmitted the RACH burst of which the ACK 530 from the base station is obtained, can be regarded as better than the first transmission antenna in terms of channel characteristics, transmitting the successive user packet data 560 by using the second transmission antenna in the packet data transmission mode 550 may increase the probability of burst detection of a demodulator in a base station.

In this case, a power calculated based on the transmission power (c) of the RACH burst signal 540 transmitted for the last time is set as the transmission power of the successive user packet data 560. Accordingly, the transmission power of the data may be equal to or different from the power set to the RACH burst of which the ACK is received.

Figure 6:
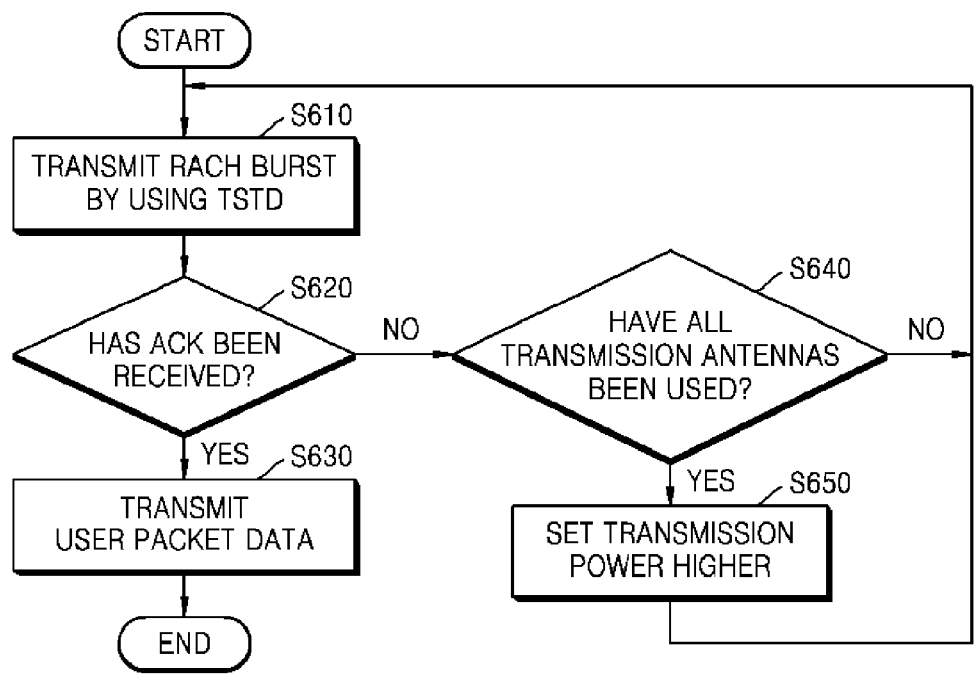
FIG. 6 is a flowchart explaining a method of obtaining transmission diversity gain of an RACH burst by using the transmission apparatus illustrated in FIG. 1 according to an embodiment of the present invention.

FIG. 6 is a flowchart explaining a transmission method used in a mobile station using the transmission apparatus illustrated in FIG. 1 according to an embodiment of the present invention.

Referring to FIG. 6, a mobile station transmits an RACH burst to a base station, by switching multi transmission antennas by using the TSTD method in operation S610: An RACH burst signal is generated by modulating the RACH burst so that the RACH burst can be loaded on a subband set in the RACH burst. The generated RACH burst signal is transmitted to the base station, by amplifying and up-converting the RACH burst signal with a preset transmission power and selecting a transmission antenna, or by selecting a transmission antenna and amplifying and up-converting the RACH burst with a preset transmission power. The switching of the transmission antenna can be determined according to a preset switching pattern.

It is determined whether or not an ACK of the transmitted RACH burst from the base station is received in operation S620.

If the ACK from the base station is received, the transmission mode of the mobile station changes from the RACH transmission mode to the packet data transmission mode, and the mobile station transmits a successive user packet data, by using the transmission antenna which is used when the last RACH burst of which the ACK is received is transmitted in operation S630. In this case, the transmission power is calculated based on the transmission power set to the last RACH burst of which the ACK is received.

If a NACK from the base station is received, the mobile station determines whether or not all transmission antennas have been used for transmission of the RACH burst with an identical transmission power in operation S640.

If it is determined that not all transmission antennas have been used, operation S610 is performed in order to transmit the RACH burst, by using a transmission antenna different from the previous transmission antenna, by switching the transmission antennas with an identical transmission power.

If a NACK from the base station is received while all transmission antennas have been used, the mobile station newly sets the transmission power higher than the previous transmission power in operation S650, and then, performs operation S610 again in order to transmit the RACH burst by switching the transmission antennas until an ACK is received.

This method is used to obtain a transmission diversity effect, by transmitting an RACH burst to a base station by using switching diversity and power ramping, when a mobile station having two or more transmission antennas in an uplink of an OFDMA-based or DFT-S OFDMA-based cellular system attempts random access.

If a mobile station having multiple antennas combines TSTD switching diversity and power ramping, the probability that when the speed of the mobile station is low, the mobile station falls into a deep fading environment is lowered, thereby increasing the probability of detecting an RACH signature of the base station.

Figure 7:
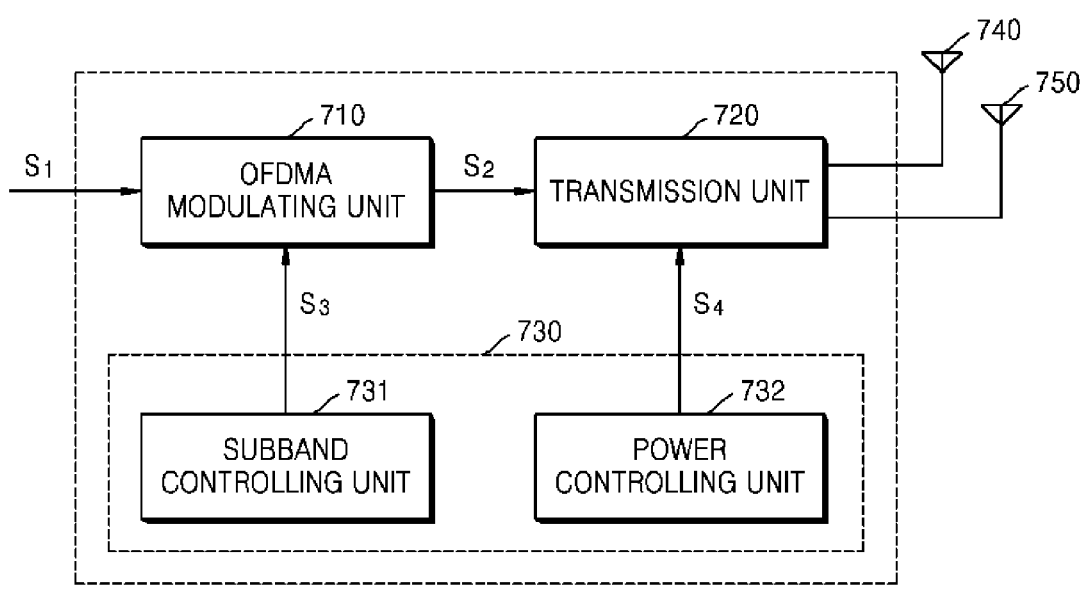
FIG. 7 is a block diagram illustrating an internal structure of a transmission apparatus of a mobile station obtaining transmission diversity gain of an RACH burst, by using multi subband (multi band), frequency hopping, power ramping, and TSTD methods according to an embodiment of the present invention.

FIG. 7 is a block diagram illustrating an internal structure of a transmission apparatus of a mobile station obtaining transmission diversity gain of an RACH burst, by using multi subband (multi band), frequency hopping, power ramping, and TSTD methods according to an embodiment of the present invention. A frequency hopping technique is added to the embodiment illustrated in FIG. 1, in order to implement the embodiment illustrated in FIG. 7.

Referring to FIG. 7, the transmission apparatus of the mobile station having two transmission antennas 740 and 750 includes an OFDMA modulating unit 710, a transmission unit 720 and a controlling unit 730.

Figure 8:
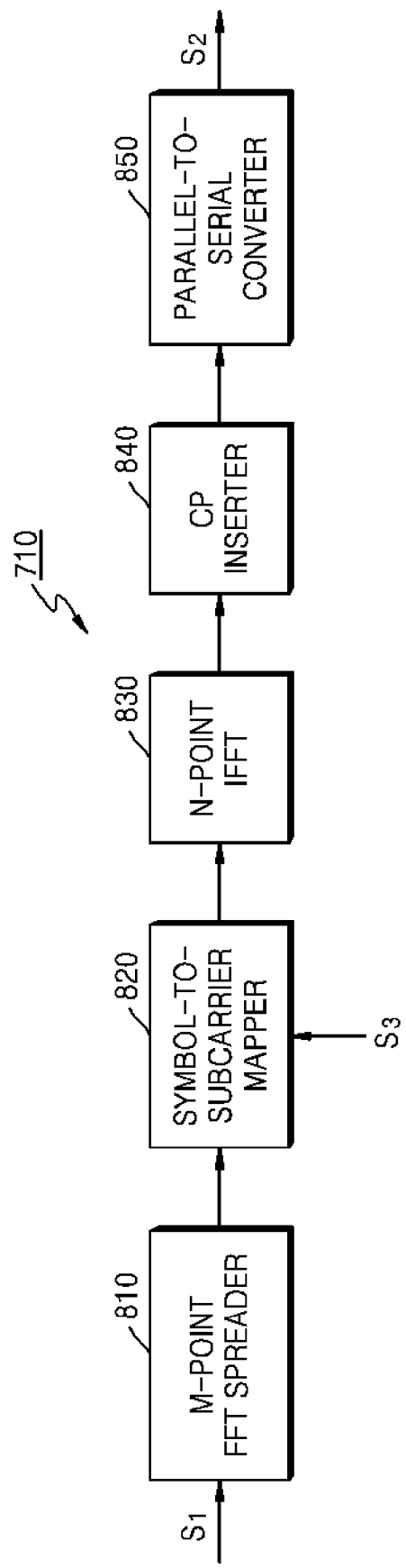
FIG. 8 is a block diagram illustrating an internal structure of an OFDMA modulating unit of a transmission apparatus illustrated in FIG. 7 according to an embodiment of the present invention.

An example of the OFDMA modulating unit 710 is illustrated in FIG. 8. Referring to FIG. 8, the structure and function of the OFDMA modulating unit 710 are the same as those of the OFDMA modulating unit 110 illustrated in FIG. 2, but due to the addition of the frequency hopping, a symbol-to-subcarrier mapper 820 maps M symbols output from an M-point FFT spreader 810, to subcarriers of the corresponding subbands, respectively, according to a subband control signal ($S_3$) of the controlling unit 730. The complex number values mapped onto the N subcarrier waves are output to an N-point IFFT unit 830. Since FIG. 2 can be referred to, a detailed explanation about the remaining parts will be omitted here.

Since the structure and function of the transmission unit 720 are the same as those of the transmission units illustrated in FIGS. 3A and 3B, a detailed explanation will be omitted here.

The controlling unit 730 includes a subband controlling unit 731 and a power controlling unit 732. The subband controlling unit 731 generates a control signal ($S_3$) controlling a subband allocated to the RACH burst ($S_1$), and the power controlling unit 732 generates a control signal ($S_4$) controlling the power of the RACH burst signal ($S_2$). Until an ACK of the RACH burst from a base station is received, the controlling unit 730 resets a subband allocated to each RACH burst and a transmission power. Also, if an ACK is received, the controlling unit 730 allocates the subband allocated to the RACH burst of which the ACK is received, to a successive user packet data, including an RACH message, and sets the power applied to the RACH burst of which the ACK is received, or a power based on the applied power, to the OFDMA modulated successive user packet data.

When the subband controlling unit 731 controls so that only one subband is allocated to the RACH burst ($S_1$), the subband controlling unit 731 performs the same function as that illustrated in FIG. 1.

Figure 9:
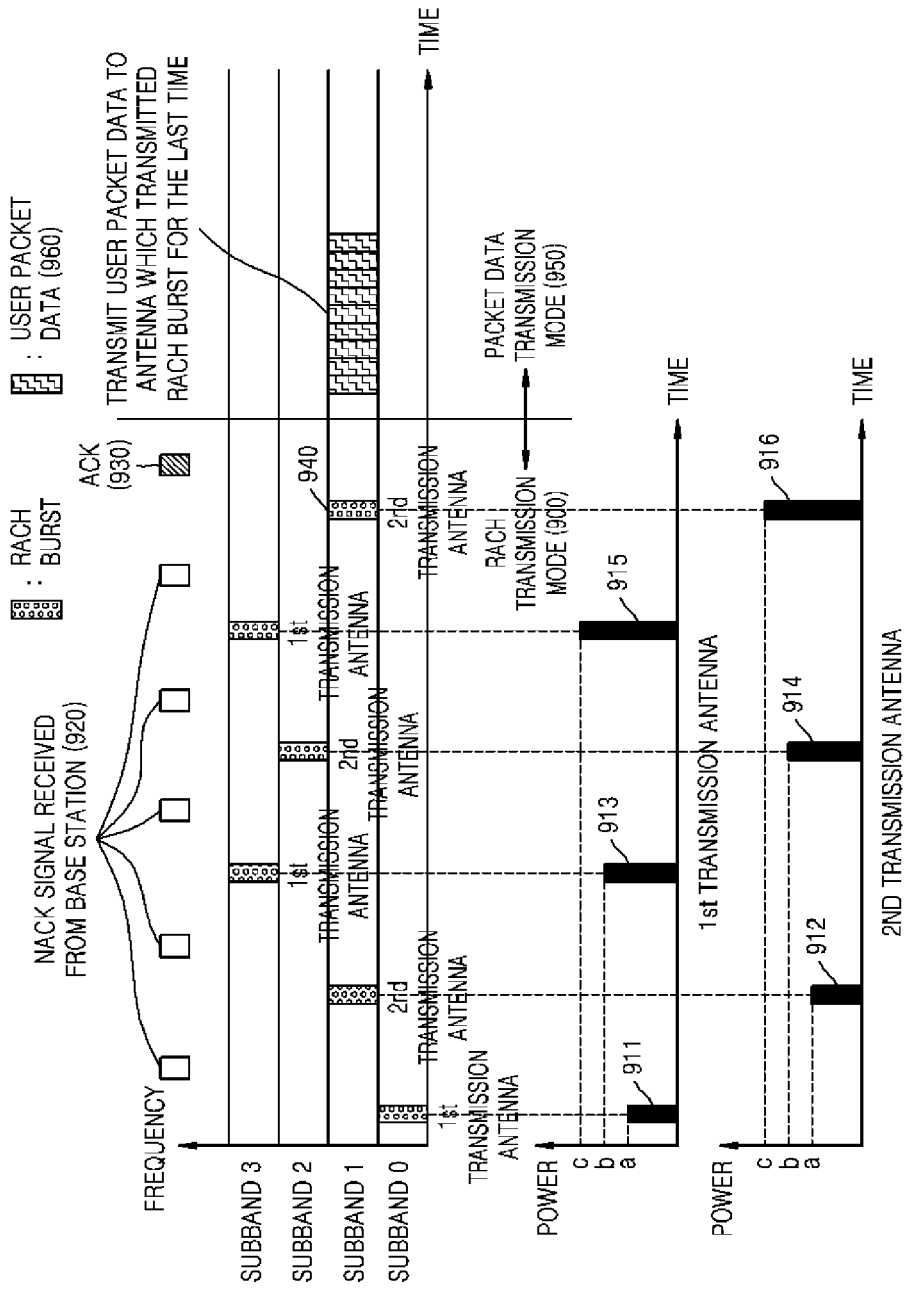
FIG. 9 is a diagram illustrating an example of a method of obtaining transmission diversity gain of an RACH burst by using the transmission apparatus illustrated in FIG. 7 according to an embodiment of the present invention.

FIG. 9 is a diagram illustrating an example of a method of obtaining transmission diversity gain of an RACH burst by using the transmission apparatus illustrated in FIG. 7 according to an embodiment of the present invention.

In the current embodiment, four subbands (subband 0 through subband 3) and two first transmission antenna and second transmission antenna are used. Also, for the frame structure of the current embodiment, the 3G LTD uplink frame structure using the DFT-S OFDMA method illustrated in FIG. 4 can be referred to.

In an RACH transmission mode 900, a mobile station transmits an RACH burst to a base station, by using multiple subbands by switching transmission antennas at a predetermined power level. The RACH burst signal is loaded on subband 0 of a first radio frame, and transmitted through a first transmission antenna with a transmission power 911 at level (a). If a NACK 920 from the base station is received, the mobile station transmits an RACH burst signal in a subband of a second radio frame, through a second transmission antenna with a transmission power 912 at level (a). If an ACK from the base station is not received even after all transmission antennas have been used, the mobile station transmits an RACH burst, by switching the transmission antennas with a transmission power at levels (b) and (c) that are predetermined margins higher, respectively, than the previous transmission power level (a). The transmission power level may be raised after all transmission antennas are used and all subbands are used.

If an RACH burst signal is loaded on a subband of a sixth wireless frame and transmitted through the second transmission antenna with a transmission power at level (c), and the mobile station receives an ACK signal 930 from the base station, the transmission mode of the mobile station changes from the RACH transmission mode 900 to a packet data transmission mode 950. In the packet data transmission mode 950, the mobile station transmits a successive user packet data 960 through the second transmission antenna which transmitted the RACH burst signal 940 of which the ACK signal is received.

Since the subband and the second transmission antenna which transmitted the RACH burst of which the ACK 930 from the base station is obtained can be regarded as better than the other subbands and the first transmission antenna in terms of channel characteristics, transmitting the successive user packet data 960 by using the subband 1 and the second transmission antenna in the packet data transmission mode 950 may increase the probability of burst detection of a demodulator in a base station.

In this case, the transmission power of the successive user packet data 960 is calculated based on the transmission power (c) of the RACH burst signal 940 transmitted for the last time. Accordingly, the transmission power of the data may be equal to or different from the power set to the RACH burst of which the ACK is received.

A pattern for selecting a transmission antenna and a pattern for selecting a subband may be the same according to frequency hopping and a TSTD design, or may vary by periods. Accordingly, it can be clearly understood by a person of ordinary skill in the art of the present invention that the combination of a subband and a transmission antenna is not limited by the current embodiment.

Figure 10:
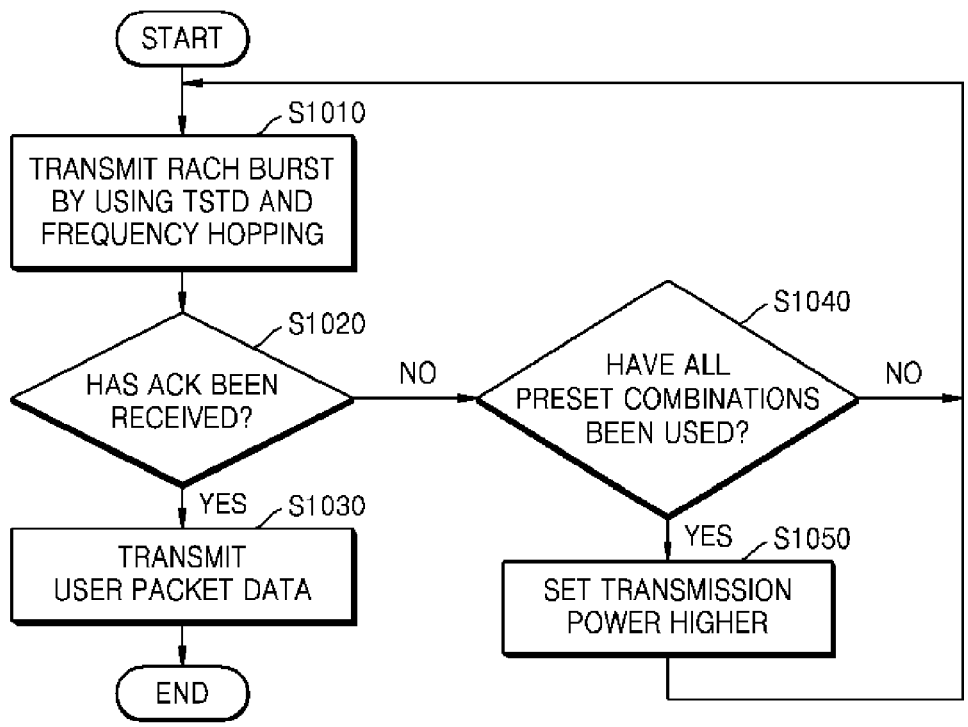
FIG. 10 is a flowchart explaining a method of obtaining transmission diversity gain of an RACH burst by using the transmission apparatus illustrated in FIG. 7 according to an embodiment of the present invention.

FIG. 10 is a flowchart explaining a transmission method used in a mobile station according to the embodiment illustrated in FIG. 7.

Referring to FIG. 10, in each transmission of an RACH burst, a mobile station changes the combination of a subband and a transmission antenna used for the transmission, and transmits the RACH burst signal at a set transmission power in operation S1010. The RACH burst signal is an OFDMA-modulated signal which is OFDMA-modulated so that an RACH burst can be loaded in a preset subband. The RACH burst signal is transmitted to a base station, after amplifying and up-converting the RACH burst signal and then, selecting a transmission antenna, or after selecting a transmission antenna and then, amplifying and up-converting the RACH burst signal with a preset transmission power. Selection of a subband and switching of a transmission antenna can be determined according to a preset pattern.

It is determined whether or not an ACK from the base station of the transmitted RACH burst is received in operation S1020.

If the ACK from the base station is received, the transmission mode of the mobile station changes from an RACH transmission mode to a packet data transmission mode, and the mobile station transmits a successive user packet data, by using the transmission antenna and subband which are used for transmission of the RACH burst of which the ACK is received in operation S1030. In this case, the transmission power of the successive user packet data is calculated based on the transmission power used for transmission of the RACH burst of which the ACK is received.

Accordingly, the transmission power of the data may be equal to or different from the power set to the RACH burst of which the ACK is received.

If an ACK from the base station is not received (if a NACK is received), the mobile station determines whether or not all combinations of selectable subbands and transmission antennas are used for the transmission of the RACH burst at an identical transmission power in operation S1040.

If not all combinations are used, operation S1010 is performed again in order to transmit the RACH burst signal by changing the remaining combination of the subbands and the transmission antennas with the identical transmission power.

If it is determined that all combinations are used, the mobile station sets the transmission power higher than the previous transmission power in operation S1050, and then, performs operation S1010 again in order to transmit the RACH burst by changing the combination of the subbands and the transmission antennas until an ACK is received.

This method is used to obtain a transmission diversity effect, by transmitting an RACH burst to a base station by using frequency hopping, switching diversity and power ramping, when a mobile station having two or more transmission antennas in an uplink of an OFDMA-based or DFT-S OFDMA-based cellular system attempts random access.

If a mobile station having multiple antennas combines TSTD switching diversity, frequency hopping and power ramping, the probability that when the speed of the mobile station is low, the mobile station falls into a deep fading environment is lowered, thereby increasing the probability of detecting an RACH signature of the base station.

Figure 11:
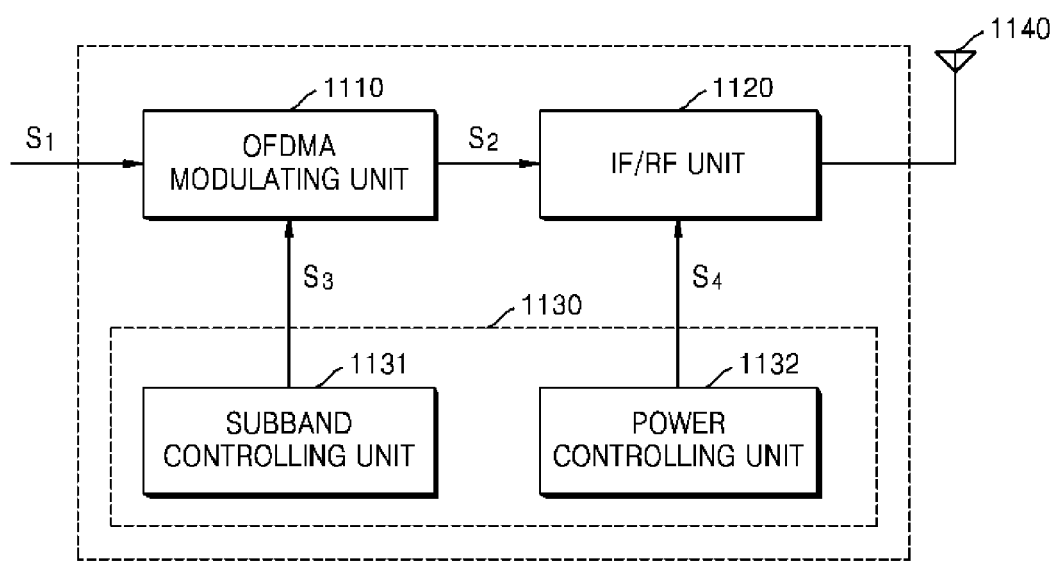
FIG. 11 is a block diagram illustrating an internal structure of a transmission apparatus of a mobile station obtaining transmission diversity gain of an RACH burst, by using frequency hopping, and power ramping according to an embodiment of the present invention.

FIG. 11 is a block diagram illustrating an internal structure of a transmission apparatus of a mobile station obtaining transmission diversity gain of an RACH burst, by using frequency hopping, and power ramping according to an embodiment of the present invention.

Referring to FIG. 11, the transmission apparatus of mobile station having one transmission antenna 1140 includes an OFDMA modulating unit 1110, an IF/RF unit 1120, and a controlling unit 1130.

The OFDMA modulating unit 1110 allocates a predetermined subband to an RACH burst ($S_1$) and modulates the RACH burst ($S_1$), thereby generating an RACH burst signal ($S_2$) which is a modulated signal. If an ACK from a base station of the RACH burst is received, the OFDMA modulating unit 1110 modulates a successive user packet data, including an RACH message, and transmits the successive user packet data to the IF/RF unit 1120. In this case, the successive user packet data is allocated to the subband allocated to the RACH burst of which the ACK is received.

Since the structure and function of the OFDMA modulating unit 1110 are the same as those of the OFDMA modulating unit 710 illustrated in FIG. 8, a detailed explanation will be omitted here.

The IF/RF unit 1120 amplifies and up-converts the RACH burst signal ($S_2$) which is the output of the OFDMA modulating unit 1110, with a predetermined power, and then, transmits the RACH burst signal ($S_2$) to the transmission antenna 1140. Also, if an ACK from the base station of the RACH burst is received, the IF/RF unit 1120 amplifies and up-converts the OFDMA-modulated successive user packet data, including the RACH message, which is received from the OFDMA modulating unit 1110, and then, transmits the successive user packet data to the transmission antenna 1140. In this case, a transmission power calculated based on the transmission power set to the RACH burst of which the ACK is received is used for the successive user packet data. Accordingly, the transmission power of the data may be equal to or different from the power set to the RACH burst of which the ACK is received.

The controlling unit 1130 includes a subband controlling unit 1131 and a power controlling unit 1132. The subband controlling unit 1131 generates a control signal ($S_3$) for controlling a subband allocated to the RACH burst ($S_1$) and the power controlling unit 1132 generates a control signal ($S_4$) for controlling the power of the RACH burst signal ($S_2$). Until an ACK from the base station of the RACH burst is received, the controlling unit 1130 resets a subband and power allocated to each RACH burst. Also, if an ACK is received, the controlling unit 1130 allocates the subband which is allocated to the RACH burst of which the ACK is received, to the successive user packet data, and sets a transmission power which is calculated based on the transmission power set to the RACH burst of which the ACK is received, to the OFDMA-modulated successive user packet data. Accordingly, the transmission power of the data may be equal to or different from the power set to the RACH burst of which the ACK is received.

Figure 12:
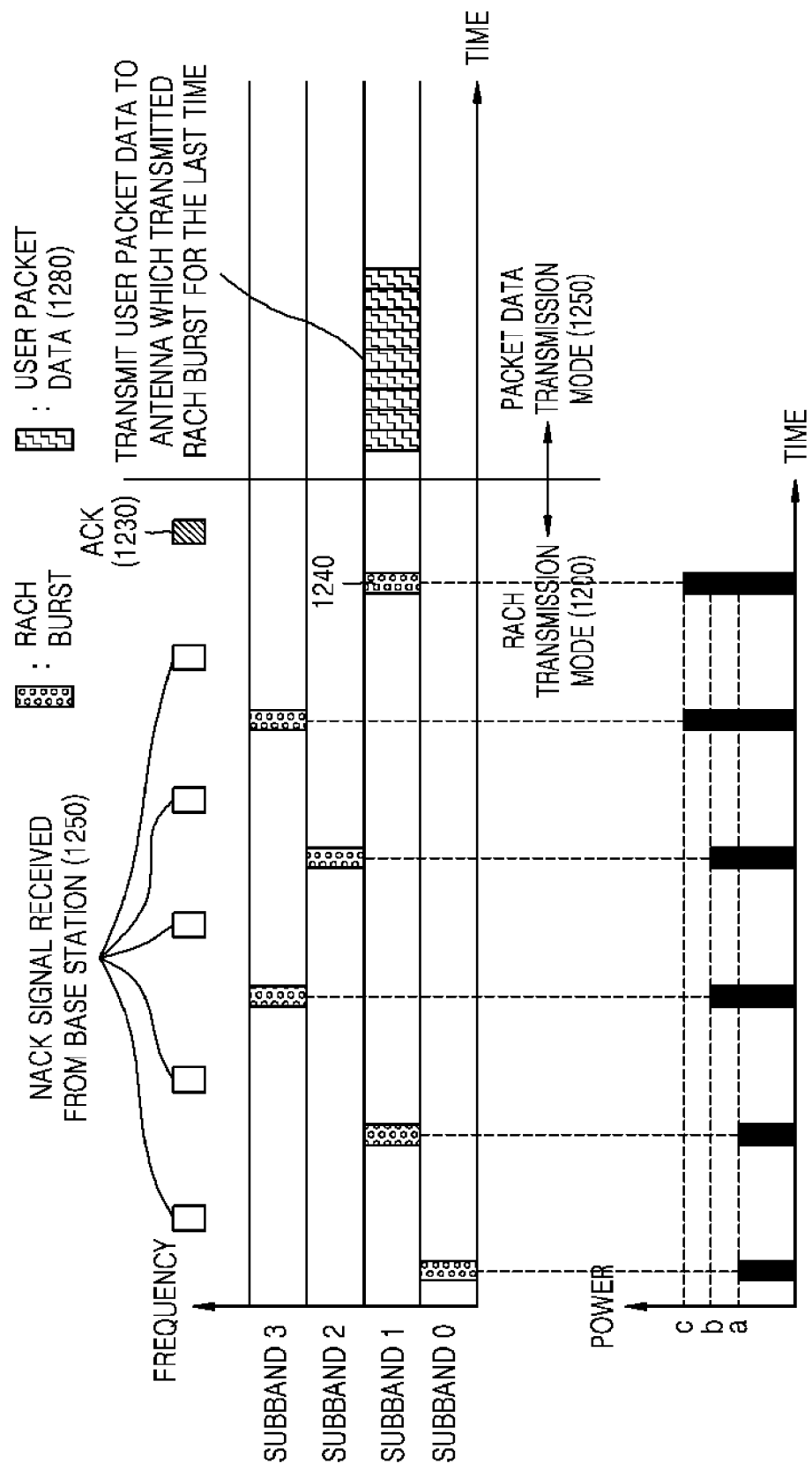
FIG. 12 is a diagram illustrating an example of a method of obtaining transmission diversity gain of an RACH burst by using a transmission apparatus illustrated in FIG. 11 according to an embodiment of the present invention.

FIG. 12 is a diagram illustrating an example of a method of obtaining transmission diversity gain of an RACH burst by using a transmission apparatus illustrated in FIG. 11 according to an embodiment of the present invention.

In the current embodiment, four subbands (subband 0 through subband 3) are applied. Also, for the frame structure of the current embodiment, the 3G LTD uplink frame structure using the DFT-S OFDMA method illustrated in FIG. 4 can be referred to.

Referring to FIG. 12, in an RACH transmission mode 1200, a mobile station transmits an RACH burst to a base station through a transmission antenna at a predetermined power level (a), by using a subband 0 in the first radio frame. If a NACK 1220 from the base station is received by the mobile station as a response to this RACH burst, the mobile station again transmits an RACH burst to the base station through the transmission antenna at the power level (a), by using a subband 1 in a second radio frame. Until an ACK 1230 is received, the mobile station repeatedly transmits an RACH burst, by changing subbands at the identical power in a preset period.

If the ACK 1230 is not received during the predetermined period, the mobile station raises the power to a predetermined margin, and then, repeatedly transmits an RACH burst to the base station, by changing subbands in a predetermined period, until the ACK 1230 is received. This is because transmitting the RACH burst by raising the power level can increase the probability of detecting an RACH signature of the base station.

In the current embodiment, the mobile station transmits the RACH burst 1240 by using subband 1 of a sixth radio frame, and then, receives the ACK 1230 signal. If the ACK 1230 from the base station is received, the transmission mode changes from an RACH transmission mode 1200 to a data transmission mode 1250. The base station allocates a resource with which a next RACH message is to be transmitted, to the ACK signal, and the resource is the one that has been used when the RACH burst has been transmitted.

In the data transmission mode 1250, the mobile station transmits a successive user packet data 1260, including an RACH message, by using the subband (subband 1) which is used for the last RACH burst 1240 of which the ACK is received. A transmission power which is calculated based on the power level (c) is set as the transmission power of the successive user packet data. Accordingly, the transmission power of the data may be equal to or different from the power set to the RACH burst of which the ACK is received.

By allocating the subband which is allocated to the RACH burst transmitted by the mobile station, to transmission of an RACH message of the mobile station, the base station may increase a reception ratio of an RACH message. Also, by transmitting an RACH message with a power which is calculated based on the power level used for transmission of the RACH burst, the mobile station can increase a reception ratio of an RACH message of the base station, while keeping the level of interference low.

Figure 13:
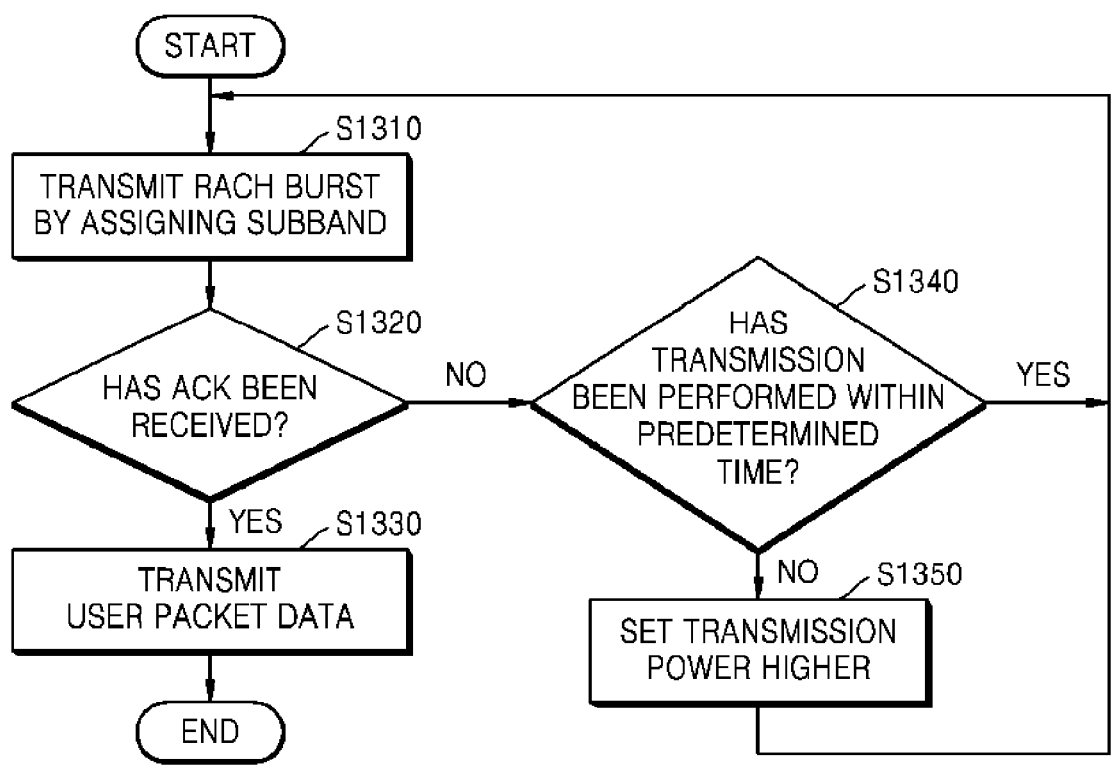
FIG. 13 is a flowchart illustrating a transmission method used in a mobile station by using a transmission apparatus illustrated in FIG. 11 according to an embodiment of the present invention.

FIG. 13 is a flowchart illustrating a method of obtaining transmission diversity gain of an RACH burst by using the transmission apparatus illustrated in FIG. 11 according to an embodiment of the present invention.

Referring to FIG. 13, first, a mobile station transmits an RACH burst to a base station, by allocating a predetermined subband to the RACH burst by using frequency hopping in operation S1310. That is, an RACH burst signal is generated by performing OFDMA modulation so that the RACH burst can be loaded on the subband. Then, the RACH burst signal is amplified to a predetermined power level and up-converted, and transmitted to the base station through a transmission antenna.

It is determined whether or not an ACK of the transmitted RACH burst from the base station is received in operation S1320.

If the ACK from the base station is received, the transmission mode of the mobile station changes from an RACH transmission mode to a packet data transmission mode, and by using the subband for the last RACH burst of which the ACK is received, the mobile station transmits a successive user packet data, including an RACH message in operation S1330. The transmission power of the successive user packet data is calculated based on the transmission power of the RACH burst of which the ACK is received. Accordingly, the transmission power of the data may be equal to or different from the power set to the RACH burst of which the ACK is received.

If the ACK from the base station is not received, it is determined whether or not a predetermined time has elapsed in operation S1340.

If it is still within the predetermined time, operation S1310 is performed again so that the subband can be reset in order to again transmit an RACH burst.

If the ACK from the base station is not received during the predetermined time, a power is set higher than the previously set transmission power in operation S1350, and operation S1310 is performed again so that the subband can be reset in order to again transmit an RACH burst.

This method is used to obtain a transmission diversity effect, by transmitting an RACH burst to a base station by using frequency hopping and power ramping, when a mobile station having one transmission antenna and one amplifier in an uplink of an OFDMA-based or DFT-S OFDMA-based cellular system attempts random access.

If a mobile station having one antenna combines frequency hopping and power ramping in order to transmit an RACH burst, the probability that when the speed of the mobile station is low, the mobile station falls into a deep fading environment is lowered, thereby increasing the probability of detecting an RACH signature of the base station. Also, by allocating the channel verified by the RACH to a successive user packet data, the base station can increase the probability of detecting an RACH message.

It can be clearly understood by a person of ordinary skill in the art of the present invention that the current embodiment can also be applied to a mobile station having multiple antennas and one amplifier.

Figure 14:
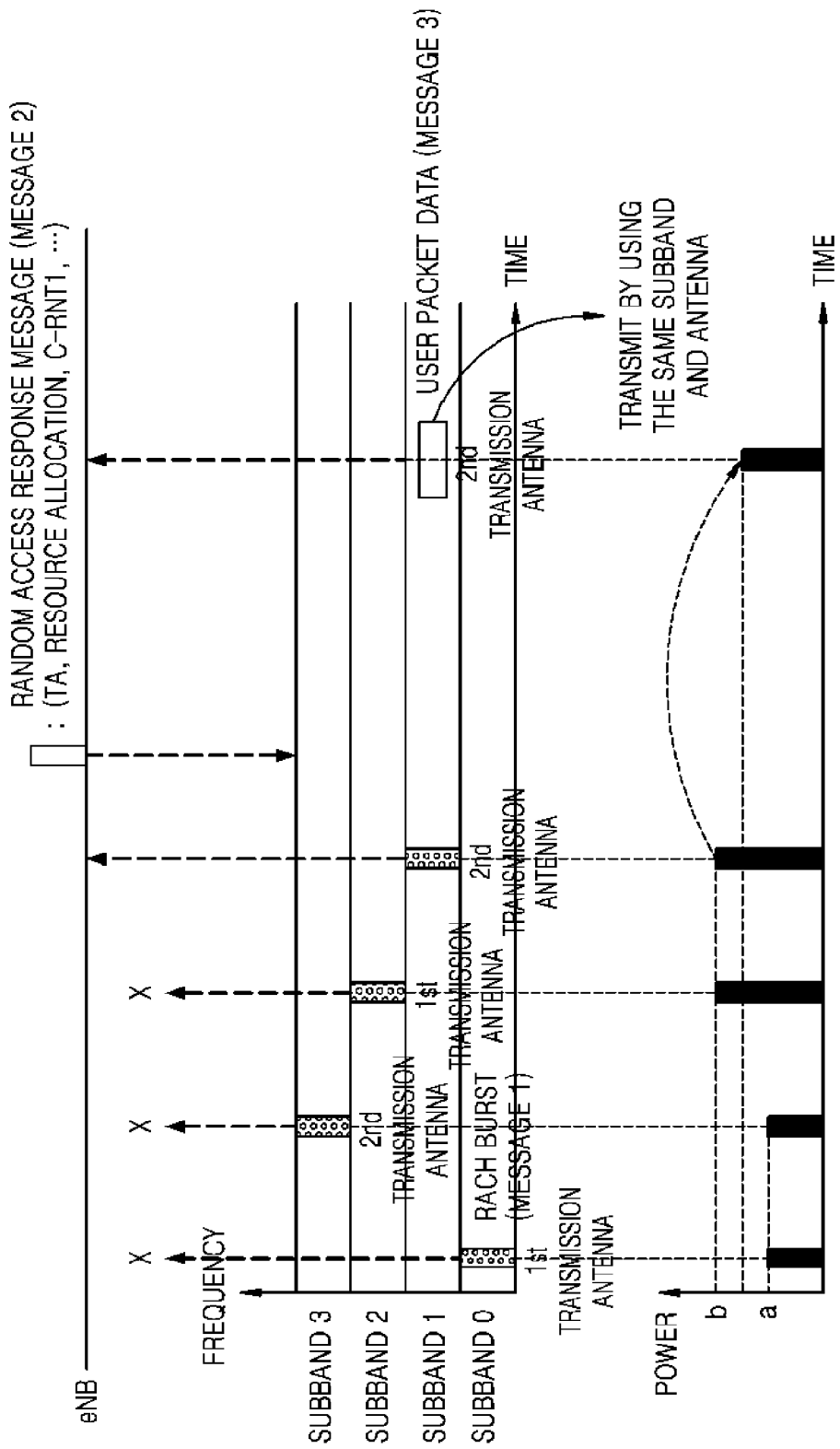
FIG. 14 is a diagram illustrating an example of a method of determining a transmission power of a successive user packet data in each of the embodiments of the present invention.

FIG. 14 is a diagram illustrating an example of a method of determining a transmission power of a successive user packet data in each of the embodiments of the present invention described above with reference to FIGS. 1, 7, and 11.

Although FIG. 14 illustrates an example in which frequency hopping is introduced, the method can be identically applied to the case illustrated in FIG. 1 in which a single subband is used.

In FIG. 14, it is assumed that a signal-to-noise (SNR) value required for an RACH burst (message 1) to be successful is SNR1, and an SNR value required for a successive user packet data (message 3), which is transmitted after an ACK (message 2) from the base station of the RACH burst (message 1) is received, to be successful is SNR2. Also, it is assumed that the transmission power of the successful message 1 is power 1 and a transmission power to be used for transmission of the message 3 is power 2.

In this case, the SNR value of the random access preamble (message 1) varies according to the structure of the transmitted preamble, and the uplink (UL) message (message 3) also varies with respect to a modulation and coding scheme (MCS) and the size of preamble.

If the same frequency band (subband) and antenna as those of the message 1 which is the last successful preamble are used for the message 3, it is highly probable that the same channel environment can be maintained. Accordingly, the power 2 can be obtained by adding a margin to the difference between the two SNR values and multiplying by the power 1 as given by equation 1 below.

$$\text{Power 2} = \text{Power 1} * 10^{\{(SNR2-SNR1+\text{Delta\_SNR})/10\}} \quad (1)$$

Here, Delta_SNR is a marginal power considering channel changes according to the time difference between the preamble (message 1) and the message 3.

It can be clearly understood by a person skilled in the art of the present invention that the transmission power of the message 3 can be calculated in a variety of ways in addition to equation 1, according to a network environment and the preamble based on the transmission power (power 1) of the RACH burst of which the ACK is received.

Also, although a mobile station having one or two transmission antennas is described in the present invention for convenience of explanation, it can be clearly understood by a person of ordinary skill in the art of the present invention that the present invention can be applied to a mobile station having three or more multiple transmission antennas.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A transmission method performed by a mobile station of obtaining random access diversity, the method comprising:
   (a) transmitting a random access channel (RACH) burst signal to a base station, by using a transmission antenna selected from among multiple transmission antennas;
   (b) if an acknowledgement (ACK) response to the RACH burst signal from the base station is received, transmitting user packet data by using the transmission antenna which is used for transmission of the RACH burst signal;
   (c) if a non-acknowledgement (NACK) response to the RACH burst signal from the base station is received, transmitting a new RACH burst signal to the base station, by using a transmission antenna different from the previous transmission antenna; and
   (d) if an ACK has not been received from the base station and all the multiple transmission antennas have been used to transmit a RACH burst signal to the base station, newly setting a transmission power higher than the previously set transmission power, and then, returning to the step (a).

2. The method of claim 1, wherein the transmission power of the user packet data is set based on the transmission power which is used for the transmission of the RACH burst signal of which the ACK is generated.

3. The method of claim 1, wherein the step (a) comprises:
   (a1) generating the RACH burst signal, by performing orthogonal frequency division multiple access (OFDMA) modulation of the RACH burst signal so that the RACH burst signal can be loaded on a set subband; and
   (a2) processing the RACH burst signal and then, transmitting the RACH burst signal through the selected transmission antenna.

4. The method of claim 3, wherein the step (a2) comprises:
   up-converting the RACH burst signal into a radio frequency (RF) signal with a preset transmission power; and
   selecting a transmission antenna through which the up-converted RACH burst signal is to be transmitted.

5. The method of claim 3, wherein the step (a2) comprises:
   selecting a transmission antenna through which the RACH burst signal is to be transmitted; and
   up-converting the RACH burst signal into an RF signal with a preset transmission power.

6. The method of claim 1, wherein the RACH burst signal includes a signature sequence for identifying a mobile station which attempts random access.

7. The method of claim 1, wherein the RACH burst signal includes information on at least one of a user identifier or a resource request for setting up a call.

8. The method of claim 3, wherein the OFDMA modulation includes discrete Fourier transform-spread (DFT-S) OFDMA modulation.

9. A transmission method performed by a mobile station of obtaining random access diversity, the method comprising:
   (a) transmitting an RACH burst signal to a base station, by using a transmission antenna selected from among multiple transmission antennas and a set subband;
   (b) if an ACK of the RACH burst signal from the base station is received, transmitting user packet data by using the transmission antenna and the subband which are used for transmission of the RACH burst signal;
   (c) if a NACK of the RACH burst signal from the base station is received, transmitting a new RACH burst signal to the base station, by using a transmission antenna different from the previous transmission antenna or a subband different from the previous subband; and
   (d) if an ACK has not been received from the base station and all combinations of the transmission antennas and subbands have been used to transmit a RACH burst signal to the base station, newly setting a transmission power higher than the previously set transmission power, and then, returning to the step (a).

10. The method of claim 9, wherein the transmission power of the user packet data is set based on the transmission power which is used for the transmission of the RACH burst signal of which the ACK is generated.

11. The method of claim 9, wherein the step (a) comprises:
   (a1) generating the RACH burst signal, by performing OFDMA modulation of the RACH burst signal so that the RACH burst signal can be loaded on the set subband; and
   (a2) processing the RACH burst signal and then, transmitting the RACH burst signal through the selected transmission antenna.

12. The method of claim 11, wherein the step (a2) comprises:
   up-converting the RACH burst signal into an RF signal with a preset transmission power; and
   selecting a transmission antenna through which the up-converted RACH burst signal is to be transmitted.

13. The method of claim 11, wherein the step (a2) comprises:
   selecting a transmission antenna through which the RACH burst signal is to be transmitted; and
   up-converting the RACH burst signal into an RF signal with a preset transmission power.

14. The method of claim 9, wherein the RACH burst signal includes a signature sequence for identifying a mobile station which attempts random access.

15. The method of claim 9, wherein the RACH burst signal includes information on at least one of a user identifier or a resource request for setting up a call.

* * * * *